US010380961B2

(12) United States Patent
Sato et al.

(10) Patent No.: US 10,380,961 B2
(45) Date of Patent: Aug. 13, 2019

(54) DISPLAY DEVICE AND CONTROL METHOD FOR DISPLAY DEVICE

(71) Applicant: Sharp Kabushiki Kaisha, Sakai, Osaka (JP)

(72) Inventors: Yuichi Sato, Sakai (JP); Kenji Maeda, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/529,147

(22) PCT Filed: Dec. 2, 2015

(86) PCT No.: PCT/JP2015/083928
§ 371 (c)(1),
(2) Date: May 24, 2017

(87) PCT Pub. No.: WO2016/093127
PCT Pub. Date: Jun. 16, 2016

(65) Prior Publication Data
US 2017/0263201 A1 Sep. 14, 2017

(30) Foreign Application Priority Data
Dec. 8, 2014 (JP) .................. 2014-248320

(51) Int. Cl.
G09G 3/36 (2006.01)
G09G 3/20 (2006.01)
(Continued)

(52) U.S. Cl.
CPC ............ *G09G 3/3648* (2013.01); *G09G 3/20* (2013.01); *G09G 3/3406* (2013.01);
(Continued)

(58) Field of Classification Search
CPC ......... G09G 3/3648; G09G 2310/0213; G09G 2330/023; G09G 3/36; G09G 5/22;
(Continued)

(56) References Cited

U.S. PATENT DOCUMENTS

2006/0100515 A1* 5/2006 Nakata .................. A61B 8/06
600/441
2007/0097107 A1* 5/2007 Furukoshi ............ G09G 3/3648
345/204
(Continued)

FOREIGN PATENT DOCUMENTS

JP 09-026832 A 1/1997
JP 09-034423 A 2/1997
(Continued)

OTHER PUBLICATIONS

Official Communication issued in International Patent Application No. PCT/JP2015/083928, dated Feb. 23, 2016.

*Primary Examiner* — Md Saiful A Siddiqui
(74) *Attorney, Agent, or Firm* — Keating & Bennett, LLP

(57) ABSTRACT

The present invention allows a user to realize that a display device is in a state of low electric power consumption. A display device (1) is a display device for refreshing a display screen at a refresh rate which is variable, the display device including: an eco-state sensing circuit (8) for specifying the refresh rate which is variable; and a state display control circuit (9) for presenting a state of the specified refresh rate to a user.

12 Claims, 5 Drawing Sheets

(51) Int. Cl.
*G09G 3/34* (2006.01)
*H04N 5/63* (2006.01)

(52) U.S. Cl.
CPC ............... *G09G 2310/0213* (2013.01); *G09G 2330/021* (2013.01); *G09G 2330/023* (2013.01); *G09G 2340/0435* (2013.01); *H04N 5/63* (2013.01)

(58) Field of Classification Search
CPC .... G06F 3/038; G06F 3/04847; G06F 3/0485; G06F 3/0362
See application file for complete search history.

(56) References Cited

U.S. PATENT DOCUMENTS

| | | | |
|---|---|---|---|
| 2008/0309652 A1* | 12/2008 | Ostlund | G09G 5/363 345/211 |
| 2010/0106588 A1 | 4/2010 | Jones et al. | |
| 2012/0038618 A1 | 2/2012 | Koyama | |
| 2012/0188262 A1 | 7/2012 | Rabii | |
| 2012/0206340 A1 | 8/2012 | Mori et al. | |
| 2012/0268500 A1* | 10/2012 | Chang | G09G 3/344 345/690 |
| 2013/0257752 A1* | 10/2013 | Tripathi | G09G 3/20 345/173 |
| 2014/0022367 A1* | 1/2014 | Krupnik | A61B 1/00009 348/68 |
| 2014/0071326 A1 | 3/2014 | Jang et al. | |
| 2014/0099074 A1* | 4/2014 | Kano | H04N 5/772 386/241 |
| 2015/0009111 A1 | 1/2015 | Yamauchi | |

FOREIGN PATENT DOCUMENTS

| | | |
|---|---|---|
| JP | 2005-091385 A | 4/2005 |
| JP | 2006-330292 A | 12/2006 |
| JP | 2010-134455 A | 6/2010 |
| JP | 2011-061631 A | 3/2011 |
| JP | 2011-527477 A | 10/2011 |
| JP | 2012-063753 A | 3/2012 |
| JP | 2014-057310 A | 3/2014 |
| JP | 2014-512551 A | 5/2014 |
| JP | 2014-211536 A | 11/2014 |
| WO | 2013/105393 A1 | 7/2013 |

* cited by examiner

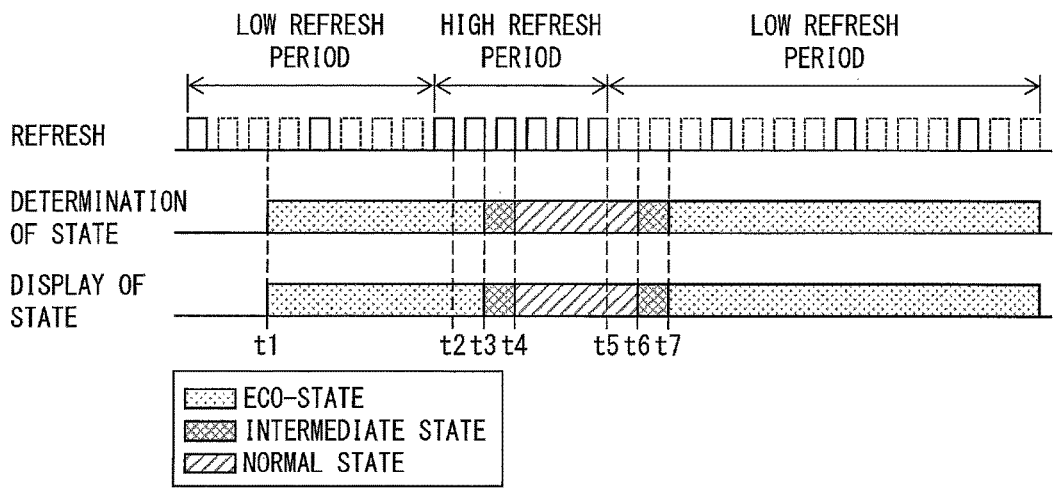
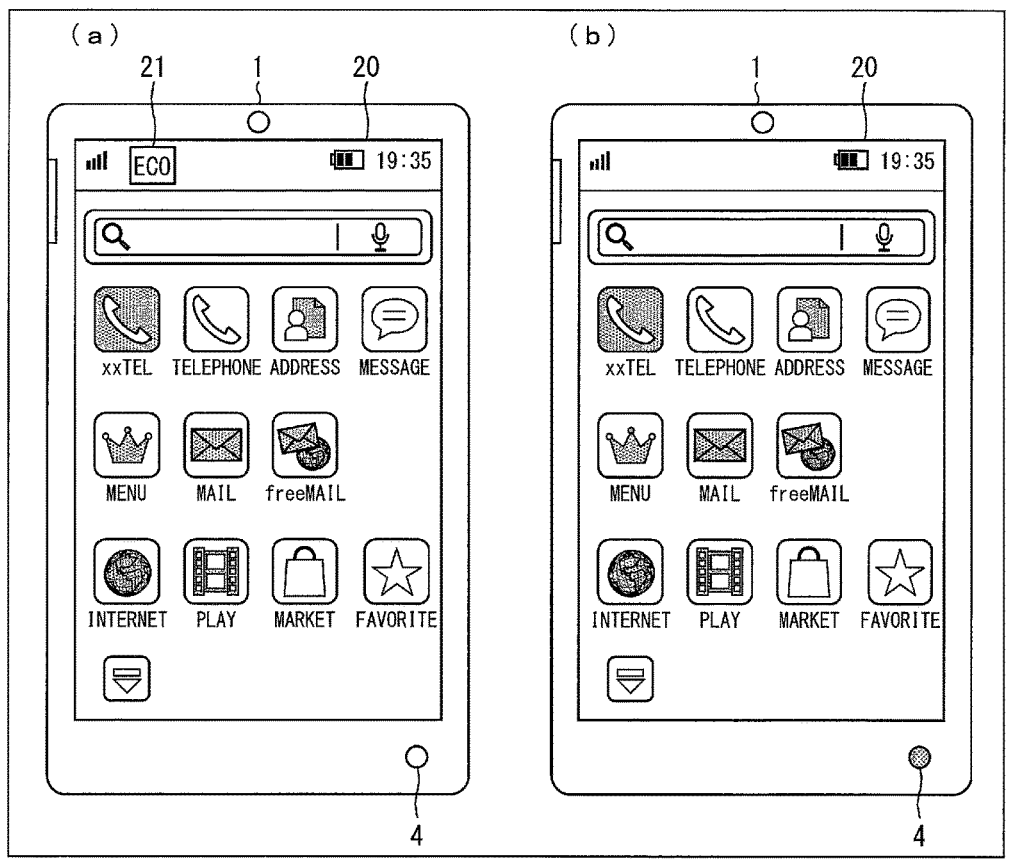

DISPLAY DEVICE AND CONTROL METHOD FOR DISPLAY DEVICE

TECHNICAL FIELD

The present invention relates to a display device, particularly to a display device for refreshing a display screen at a variable refresh rate.

BACKGROUND ART

In recent years, thin, light, and low-power-consumption display devices typified by liquid crystal display devices have been remarkably widespread. Under such circumstances, it is a shared challenge to reduce electric power consumption by various display devices. A display device that has a higher refresh rate consumes more electric power accordingly.

Patent Literature 1 discloses a technique in which a drive frequency of a drive signal supplied from a driving circuit of a liquid crystal display device is modulated in accordance with a temperature of a liquid crystal display panel. With the technique, an attempt is made to achieve lower electric power consumption by a liquid crystal display device.

CITATION LIST

Patent Literatures

[Patent Literature 1]
Japanese Patent Application Publication Tokukai No. 2005-91385 (Publication date: Apr. 7, 2005)
[Patent Literature 2]
Published Japanese Translation of PCT International Application, Tokuhyo, No. 2011-527477 (Publication date: Oct. 27, 2011)

SUMMARY OF INVENTION

Technical Problem

Note, however, that in a case where a refresh rate lower than 60 Hz is achieved in conventional Continuous Grain (CG) silicon TFT liquid crystal display panels, amorphous silicon TFT liquid crystal display panels, or the like, a display quality may deteriorate due to, for example, an ambient environment (temperature).

Meanwhile, in recent years, an oxide semiconductor liquid crystal display panel has been achieved in which TFTs are each constituted by an oxide semiconductor in which indium (In), gallium (Ga), and zinc (Zn) are used. According to a TFT constituted by an oxide semiconductor, only a small amount of electric current leaks in an off state. Therefore, unlike the cases of conventional liquid crystal panels, an oxide semiconductor liquid crystal display panel does not need to refresh a screen at 60 Hz, and thus it is possible to lower a refresh rate to as low as approximately 1 Hz. For this reason, according to an oxide semiconductor liquid crystal display panel, it is possible to pause refresh of a screen in a period in which no image is updated. This allows a reduction in electric power consumption.

Note, however, that in particular, a still image display does not change in appearance whether a display device is in a low refresh rate driving state (e.g., is driven at a refresh rate of 1 Hz) or is in a high refresh rate driving state (e.g., is driven at a refresh rate of 60 Hz). Note also that the display device automatically changes a refresh rate. Thus, even in a case where the display device is in the low refresh rate driving state, a user cannot realize that the display device is in a state of low electric power consumption.

The present invention has an object to provide a display device that allows a user to realize that the display device is in a state of low electric power consumption.

Solution to Problem

A display device in accordance with an aspect of the present invention for refreshing a display screen at a refresh rate which is variable, the display device includes: a rate detecting section for specifying the refresh rate which is variable; and a state presenting section for presenting, to a user, information indicative of a degree of the specified refresh rate.

A method in accordance with an aspect of the present invention for controlling a display device for refreshing a display screen at a refresh rate which is variable, the method includes: a rate detecting step of specifying the refresh rate which is variable; and a state presenting step of presenting, to a user, information indicative of a degree of the specified refresh rate.

Advantageous Effects of Invention

An aspect of the present invention allows a user to realize that electric power consumption is reduced by an automatic change in refresh rate by a display device.

BRIEF DESCRIPTION OF DRAWINGS

FIG. 6 is a timing chart showing another example of the refresh rate specifying method of the still another embodiment of the present invention.

FIG. 7 is a view illustrating a display screen of the display device which serves as a smartphone.

DESCRIPTION OF EMBODIMENTS

Figure 1:
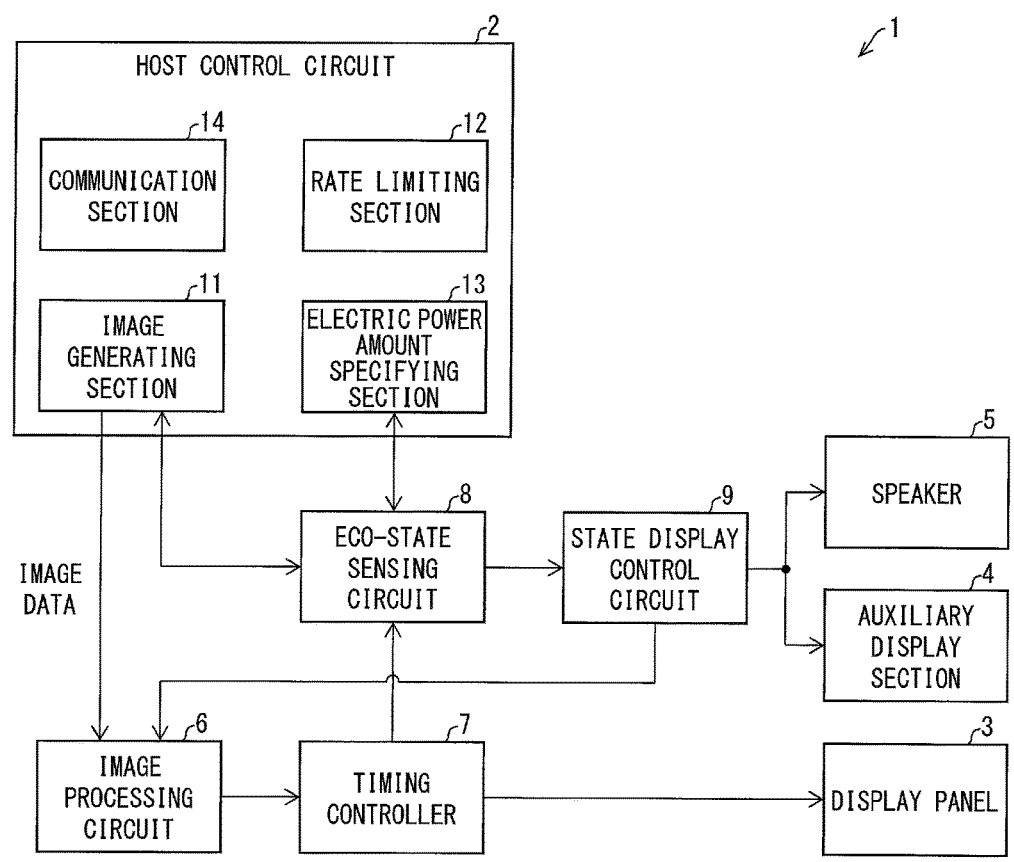
FIG. 1 is a block diagram illustrating an arrangement of a display device in accordance with an embodiment of the present invention.

The following description specifically discusses embodiments of the present invention. In a case where an arrangement described in a specific section (embodiment) below is identical to that described in another section, a description of such an arrangement may be omitted. Note that, for convenience, members having functions identical to those of the respective members described in the sections are given respective identical reference numerals, and a description of those members is omitted as appropriate.

[Embodiment 1]

(Arrangement of Display Device 1)

FIG. 1 is a block diagram illustrating an arrangement of a display device 1 of Embodiment 1. The display device 1 includes a host control circuit 2, a display panel 3, an auxiliary display section 4, a speaker 5, an image processing circuit 6, a timing controller 7, an eco-state sensing circuit 8 (rate detecting section), and a state display control circuit 9 (state presenting section). The display device 1 is a display device that omits unnecessary refresh in accordance with whether an image is updated (whether an image changes in content), i.e., a display device whose refresh rate changes in accordance with an image to be displayed. The display device 1 is herein described assuming that the display device 1 is included in a portable terminal such as a smartphone. Note, however, that the present invention is not limited to such an arrangement. The present invention is applicable to any display device whose screen needs to be refreshed. A refresh rate in terms of specifications of the display device 1 (a refresh rate at which the display device 1 is operable) is herein assumed to range from, for example, 1 Hz to 60 Hz.

(Arrangement of Host Control Circuit 2)

The host control circuit 2 is constituted by a control circuit provided on a substrate. The host control circuit 2 is mainly in charge of control of a host side of the display device 1 (e.g., control for a portable terminal). The host control circuit 2 includes an image generating section 11, a rate limiting section 12, an electric power amount specifying section 13, and a communication section 14. At least a part of the host control circuit 2 (the image generating section 11, the rate limiting section 12, the electric power amount specifying section 13, and the communication section 14) can be realized by use of, for example, a CPU and a memory.

The image generating section 11 generates image data that needs to be displayed in a display screen. For example, the image generating section 11 can generate, by use of data stored in advance, image data indicative of, for example, a menu screen of a portable terminal. The image generating section 11 can also generate image data of each frame by externally obtaining data indicative of a moving image via, for example, the communication section 14, and decoding the data. The image generating section 11 sequentially supplies the image data of the each frame to the image processing circuit 6 in accordance with a timing at which to display the image data of the each frame. For example, in a case where an image to be displayed is a moving image of 60 frames per second (fps), the image generating section 11 supplies image data of one frame per 1/60 second. In a case where the image to be displayed is a moving image of 30 fps, the image generating section 11 supplies image data of one frame per 1/30 second. In a case where the image irregularly changes in content, the image generating section 11 supplies image data to the image processing circuit 6 when the image changes in content. That is, the image generating section 11 supplies image data to the image processing circuit 6 when the display screen needs to be refreshed (when the image changes in content). Meanwhile, the image generating section 11 supplies no image data to the image processing circuit 6 in a period in which the display screen does not need to be refreshed (a period in which the image does not change in content). Note, however, that for example, in a case where a lower limit of the refresh rate of the display device 1 is 1 Hz, the image generating section 11 supplies image data to the image processing circuit 6 at least per second also in a period in which a still image is displayed.

Thus, the refresh rate of the display device 1 is variable and changes in a predetermined range in accordance with content of an image to be displayed (whether a change in content frequently occurs). The image generating section 11 can be said to determine a timing of refresh in accordance with content of an image to be displayed.

The communication section 14 includes, for example, an antenna or a connector, and establishes a wireless or wired communication with an external device. The rate limiting section 12 and the electric power amount specifying section 13 will be described in embodiments (described later).

(Arrangements of Display Panel 3, Auxiliary Display Section 4, and Speaker 5)

The display panel 3 includes a display screen including a plurality of pixels. The display panel 3 is, for example, an oxide semiconductor display panel serving as an active matrix display panel. The oxide semiconductor display panel is a display panel in which an oxide semiconductor-thin film transistor (TFT) is used for each switching element provided so as to correspond to one or more of the plurality of pixels which are two dimensionally arranged. The oxide semiconductor-TFT is a TFT having a semiconductor layer made of an oxide semiconductor. Examples of the oxide semiconductor encompass an oxide semiconductor (In-GaZnO-based oxide semiconductor) in which an oxide of indium, gallium, and zinc is used. According to the oxide semiconductor-TFT, an amount of electric current flowing in an on state is large, and an amount of leak electric current in an off state is small. Therefore, use of the oxide semiconductor-TFT for a switching element allows an increase in pixel aperture ratio and a reduction in refresh rate of an image display to approximately 1 Hz. The reduction in refresh rate brings about an effect of reducing electric power consumption. The increase in pixel aperture ratio brings about an effect of making a display brighter. In a case where the brightness of a display is set to be equal to that of an amorphous silicon display panel or the like, the increase in pixel aperture ratio brings about an effect of reducing electric power consumption by decreasing a light amount of a backlight. A liquid crystal display element is herein used as a display element of a pixel. Note, however, the display element of the pixel can be an organic electroluminescence (EL) display element. The display device 1 includes a backlight (not illustrated) provided on a back surface of the display panel 3.

The auxiliary display section 4 is a display section that is provided separately from the display screen of the display panel 3. The auxiliary display section 4 is herein a light emitting device including one or more light emitting diodes (LEDs). The auxiliary display section 4 can be arranged to include an auxiliary display screen including a plurality of pixels.

The speaker 5 carries out an audio output for a portable terminal.

(Arrangements of Image Processing Circuit 6, Timing Controller 7, Eco-state Sensing Circuit 8, and State Display Control Circuit 9)

The image processing circuit 6 is a circuit for carrying out image processing such as color adjustment with respect to image data received from the host control circuit 2. The image processing circuit 6 also carries out a process for combining (a) an image indicative of an eco-state mark and received from the state display control circuit 9 with (b) an image of the image data. The image processing circuit 6 can be a circuit that is independent of the image generating section 11, or can be integrated with the image generating section 11. The image processing circuit 6 supplies, to the timing controller 7, the image data which has been subjected to the image processing and the process for the combination.

The timing controller 7 (timing generator) is a circuit for supplying received image data to the display panel 3 at a predetermined timing (in accordance with a timing signal). The timing controller 7 also generates (i) timing signals (a source clock pulse, a gate start pulse, a gate clock pulse, and the like) for driving the display panel 3 and (ii) a data signal (source signal data indicative of an image), and supplies these signals to the display panel 3. That is, the timing controller 7 instructs the display panel 3 on refresh (updating) of the display screen and a timing thereof. Note that in a case where the display panel 3 is driven at an upper limit of the refresh rate (e.g., 60 Hz), the timing controller 7 supplies image data to the display panel 3 every vertical period (e.g., 1/60 second). The timing controller 7 supplies no image data to the display panel 3 in a vertical period in which the display screen is not refreshed. Note here that one vertical period refers to a period in which to refresh (rewrite) the display screen one time. The timing controller 7 also supplies, to the eco-state sensing circuit 8, refresh information indicating whether the display screen has been refreshed in each vertical period (whether an instruction to refresh the display screen has been given).

The eco-state sensing circuit 8 stores the refresh information received from the timing controller 7. In accordance with the number of times of instruction on refresh (the number of times of refresh) by the timing controller 7 in a most recent predetermined period (first period), the eco-state sensing circuit 8 specifies a refresh rate in that predetermined period. The refresh rate thus specified is regarded as a refresh rate at this time. A predetermined period herein can be, for example, a period of 0.1 second to 1 second, a period of a few seconds, or a period of not more than 0.1 second. In a case where the predetermined period is short, it is possible to obtain a refresh rate in which an operating state in a short period is reflected. In a case where the predetermined period is relatively long, it is possible to obtain an average refresh rate in that period.

In accordance with the specified refresh rate, the eco-state sensing circuit 8 determines a display-related operating state of the display device 1. For example, it is assumed that a state in which the refresh rate is higher than a threshold is a normal state and a state in which the refresh rate is not more than the threshold is an eco-state. The eco-state is an ecological operating state that is lower in electric power consumption necessary for display operation than the normal state. The eco-state sensing circuit 8 supplies, to the state display control circuit 9, information indicative of the operating state of the display device 1.

The state display control circuit 9 presents (reports) the display-related operating state of the display device 1 (information indicative of a degree of the refresh rate) to a user. The display device 1 herein presents the operating state to the user by displaying an eco-state mark in a part of the display screen of the display panel 3 in the eco-state. The eco-state mark is an image indicating that the display device 1 is in the eco-state. In the normal state, no eco-state mark is displayed, or the eco-state mark is displayed by, for example, being darkened. In a case where the display device 1 is in the eco-state, the state display control circuit 9 supplies, to the image processing circuit 6, information controlling (instructing) a display of the eco-state mark. Note that the state display control circuit 9 can supply, to the image processing circuit 6, an image indicative of the eco-state mark as the information controlling a display of the eco-state mark. Note also that the image processing circuit 6 can generate (prepare) the image indicative of the eco-state mark in accordance with the received information controlling a display of the eco-state mark.

For example, the state display control circuit 9 can prevent an LED of the auxiliary display section 4 from being turned on in the normal state, and can allow the LED of the auxiliary display section 4 to be turned on in the eco-state. For example, the state display control circuit 9 can cause specific audio to be outputted via the speaker 5 when the operating state is switched from the normal state to the eco-state, and can cause other audio different from the specific audio to be outputted via the speaker 5 when the operating state is switched from the eco-state to the normal state. The state display control circuit 9 can also control luminance of the backlight in accordance with the operating state so as to make the luminance of the backlight in the eco-state lower than the luminance of the backlight in the normal state. In a case where the luminance of the backlight is changed, the user can recognize the operating state by a change in brightness of the entire screen.

(Flow of Eco-state Mark Display-related Operation Carried Out by Display Device 1)

Figure 2:
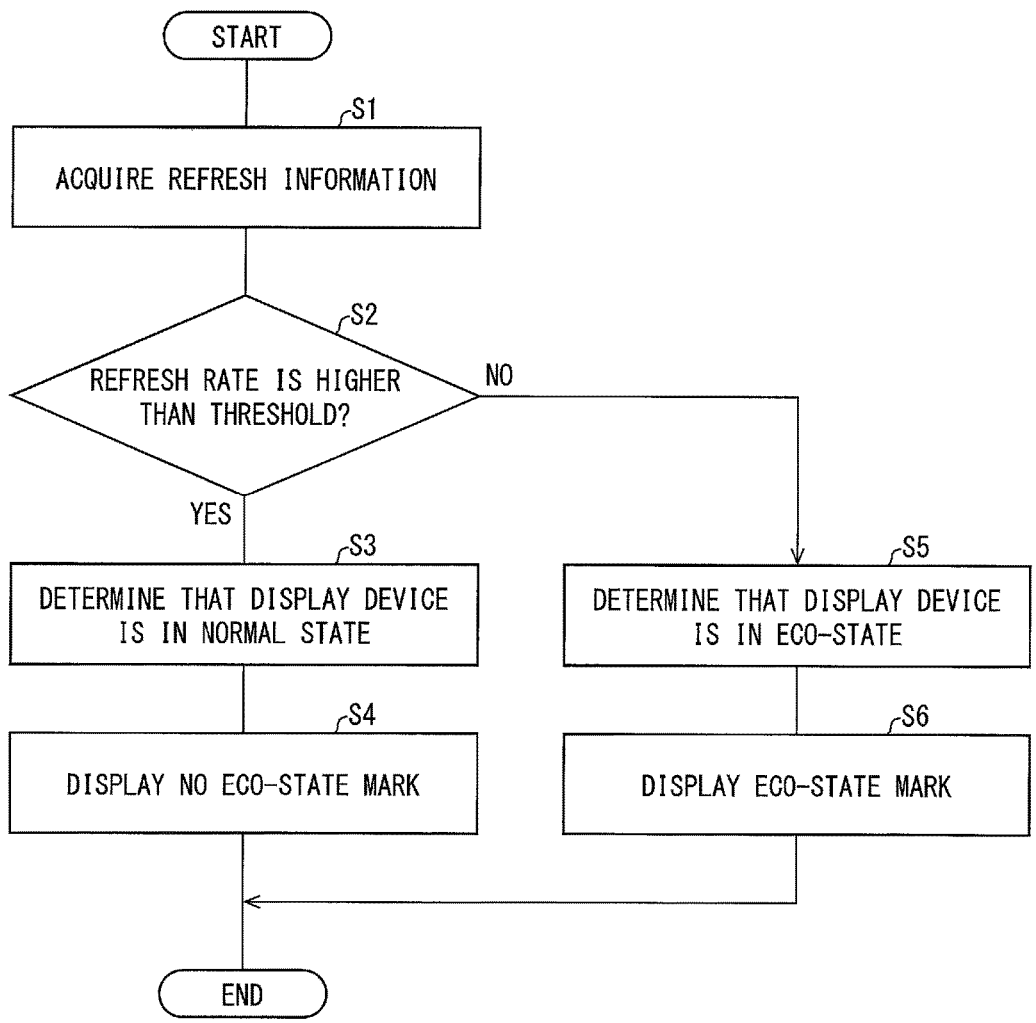
FIG. 2 is a flow chart illustrating a flow of ecologically-friendly (hereinafter merely referred to as "eco")-state mark display-related operation carried out by the display device.

FIG. 2 is a flow chart illustrating a flow of eco-state mark display-related operation carried out by the display device 1. FIG. 7 is a view illustrating a display screen 20 of the display device 1 which serves as a smartphone.

The eco-state sensing circuit 8 acquires, from the timing controller 7, refresh information indicating whether the display screen has been refreshed in each vertical period (S1). The eco-state sensing circuit 8 specifies a refresh rate in a most recent predetermined period. The eco-state sensing circuit 8 determines whether the specified refresh rate is higher than a threshold (e.g., 15 Hz) (S2, a rate detecting step).

In a case where the refresh rate is higher than the threshold (Yes in S2), the eco-state sensing circuit 8 determines that the display device 1 has a high refresh rate, i.e., is in the normal state (S3). In this case, the state display control circuit 9 supplies, to the image processing circuit 6, no information controlling a display of the eco-state mark. The image processing circuit 6 supplies, to the timing controller 7, image data including no eco-state mark. As illustrated in (b) of FIG. 7, the display device 1 thus displays no eco-state mark in the display screen 20 (S4, a state presenting step).

In a case where the refresh rate is not more than the threshold (No in S2), the eco-state sensing circuit 8 determines that the display device 1 has a low refresh rate, i.e., is in the eco-state (S5). In this case, the state display control circuit 9 supplies, to the image processing circuit 6, information controlling a display of the eco-state mark. The image processing circuit 6 combines the eco-state mark with image data in accordance with the information controlling a display of the eco-state mark. With the arrangement, the display device 1 displays an eco-state mark 21 in a part of the display screen 20 as illustrated in (a) of FIG. 7 (S6, the state presenting step).

(Refresh Rate Specifying Method 1)

Figure 3:
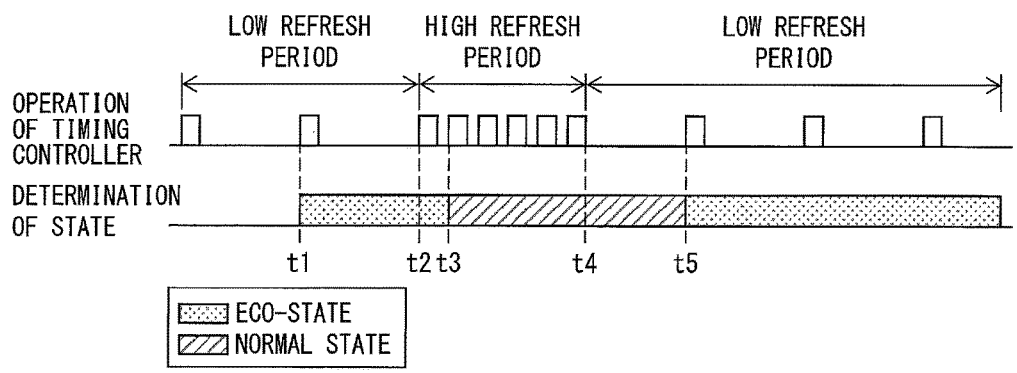
FIG. 3 is a timing chart showing an example of a refresh rate specifying method of an embodiment of the present invention.

FIG. 3 is a timing chart showing an example of a refresh rate specifying method of Embodiment 1. In FIG. 3, a horizontal axis shows time. A rectangle in "OPERATION OF TIMING CONTROLLER" of FIG. 3 shows that the timing controller 7 supplies image data to the display panel 3 in a vertical period corresponding to that rectangle, i.e., that the display screen is refreshed. A period in which the rectangle is absent is a period in which the display screen is not refreshed (the display screen does not change).

"DETERMINATION OF STATE" in FIG. 3 shows a result of determination by the eco-state sensing circuit 8 of the operating state (the eco-state or the normal state) of the display device 1.

In a period from a time t1 to a time t2, a refresh rate is relatively low. In this period, refresh can be paused in several to several ten consecutive vertical periods. In a period from the time t2 to a time t4, the refresh rate is relatively high. In this period, refresh is carried out for each vertical period. In a period from and after the time t4, the refresh rate is relatively low again.

According to Embodiment 1, for each vertical period or during operation of the timing controller 7, the eco-state sensing circuit 8 specifies the refresh rate in a most recent predetermined period (first period) in accordance with the number of times of operation by the timing controller 7 in the most recent predetermined period. For example, the timing controller 7 notifies the eco-state sensing circuit 8 that refresh is carried out at the time t2.

When refresh is carried out at the time t2, it is not known whether vertical periods in each of which refresh is carried out will be consecutive after the time t2. Thus, the eco-state sensing circuit 8 calculates the refresh rate from the number of times of refresh carried out in a past predetermined period, including refresh at the time t2. Therefore, at the time t2, the eco-state sensing circuit 8 determines that the display device 1 is in the eco-state in which the refresh rate is low.

When refresh is carried out at a time t3, the eco-state sensing circuit 8 calculates the refresh rate from the number of times of refresh carried out in a past predetermined period, including refresh at the time t3. This causes the refresh rate to be higher than a threshold, and at the time t3, the eco-state sensing circuit 8 determines that the display device 1 is in the normal state. Same applies to a period from and after the time t3 to the time t4.

From and after the time t4, a period in which refresh is paused lasts. Note, however, that a predetermined period contains several points in time at which refresh was carried out before the time t4. This causes the refresh rate in the predetermined period to be higher than the threshold. Thus, until a time t5, the eco-state sensing circuit 8 determines that the display device 1 is in the normal state.

From and after the time t5, the refresh rate in the predetermined period is not more than the threshold, and the eco-state sensing circuit 8 determines again that the display device 1 is in the eco-state in which the refresh rate is low.

Note that a display and a non-display of the eco-state mark 21 are switched at a timing of refresh subsequently to sensing by the eco-state sensing circuit 8 of switching between the eco-state and the normal state. This is because content of the display screen is unchanged in a period in which the display screen is not refreshed. After the eco-state sensing circuit 8 senses switching between the eco-state and the normal state in accordance with operational information (refresh information) of the timing controller 7 which has received image data, the image processing circuit 6 needs to combine the image data and an image of the eco-state mark. Thus, for example, the eco-state mark 21 starts to be displayed at a timing at which the second refresh is carried out after the time t5.

Embodiment 1 allows a user to recognize that the display device 1 which refreshes the display screen 20 at a variable refresh rate is operating while having a low refresh rate (consuming a small amount of electric power). An automatic change in refresh rate by the display device 1 allows the user to realize that electric power consumption is reduced. By causing the user to realize that electric power consumption is reduced, it is possible to raise eco-awareness of the user and to cause the user to be aware of how to use the display device 1 (portable terminal) so as to maintain its eco-state for a long time. This allows the display device 1 to have a greater energy-saving effect.

It is possible to set any length as a length of a predetermined period for specifying the refresh rate. The predetermined period which is relatively long causes the eco-state sensing circuit 8 to calculate an average refresh rate of a long period. Thus, also in a case where a low refresh rate and a high refresh rate are alternately switched in a short period, it is possible to prevent a display of the eco-state mark 21 from being frequently switched. Meanwhile, the predetermined period which is relatively short causes the eco-state sensing circuit 8 to calculate a refresh rate of a short period. This makes it possible to improve followability of a display and a non-display of the eco-state mark 21 with respect to an actual change in operating state.

Note that it is possible to set a plurality of thresholds of determination of the operating state. For example, in a case where the refresh rate is not higher than a first threshold in the predetermined period, the eco-state sensing circuit 8 can determine that the operating state is a first eco-state. In a case where the refresh rate is higher than a second threshold in the predetermined period, the eco-state sensing circuit 8 can determine that the operating state is the normal state. In a case where the refresh rate is higher than the first threshold and not higher than second threshold in the predetermined period, the eco-state sensing circuit 8 can determine that the operating state is a second eco-state. The first threshold is lower than the second threshold. The second eco-state is an intermediate state between the first eco-state and the normal state. As described above, the operating state can be divided into three or more levels. In accordance with each of the states, brightness, density, color, and/or the like of the eco-state mark 21 can be changed.

Further, it is possible to set two thresholds (first threshold<second threshold) for one boundary between the operating states and to introduce a hysteresis in determination of a change in operating state. For example, the change in operating state from the normal state to the eco-state is determined on a condition that the refresh rate is not higher than the first threshold (e.g., 10 Hz). Meanwhile, the change in operating state from the eco-state to the normal state is determined on a condition that the refresh rate is not lower than the second threshold (e.g., 30 Hz). By thus causing a result of determination of the operating state to have a hysteresis characteristic, it is possible to prevent a display and a non-display of the eco-state mark 21 from being frequently switched.

The state display control circuit 9 can be arranged not to change a display state of the eco-state mark 21 again during a given period after the display state of the eco-state mark 21 is changed. This makes it possible to prevent a display and a non-display of the eco-state mark 21 from being frequently switched.

The state display control circuit 9 can also be arranged to display the eco-state mark 21 only when a plurality of predetermined periods in each of which the refresh rate is not higher than a threshold is consecutive. This makes it possible to prevent a display and a non-display of the eco-state mark 21 from being frequently switched.

Further, the threshold can be set at a lower limit (e.g., 1 Hz) of the refresh rate, and the state display control circuit 9 can be arranged to display the eco-state mark 21 only when the refresh rate has a lower limit value. This makes it possible to prevent an increase in electric power consumption which increase occurs in association with a display of the eco-state mark 21.

The timing controller 7 (or the image generating section 11, the image processing circuit 6) which reduces the refresh rate in accordance with image content can reduce the refresh rate gradually (in stages) also during a display of a still image. For example, the timing controller 7 can change the refresh rate from 60 Hz, 30 Hz, 15 Hz, . . . to 1 Hz in stages instead of changing the refresh rate from 60 Hz to 1 Hz immediately. The state display control circuit 9 switches between a display and a non-display of the eco-state mark 21 when refresh is carried out. Without the fear of an increase in electric power consumption required for the refresh, it is possible to reduce a delay in display of the eco-state mark 21 (to allow real-time expression). In the case of a still image, the image generating section 11 or the image processing circuit 6 can store image data of a previous frame and supply the identical image data to a subsequent stage.

[Embodiment 2]

Embodiment 2 differs from Embodiment 1 in that Embodiment 2 is arranged such that a refresh rate is specified in accordance with a waiting time of a host control circuit 2. According to Embodiment 2, an eco-state sensing circuit 8 acquires information of a waiting time of an image generating section 11 from the host control circuit 2 instead of acquiring refresh information from a timing controller 7. Note that an arrangement of a display device of Embodiment 2 is identical to the arrangement illustrated in FIG. 1.

In a case where there is no change in image to be displayed, it is unnecessary to supply image data to an image processing circuit 6. Thus, the image generating section 11 pauses an operation to transfer image data. A period in which such a transfer operation is paused is a waiting time (standby time) of the image generating section 11. The waiting time is counted by use of a timer. The waiting time can also be said to be a time that has elapsed from the last time the image generating section 11 transferred (supplied) image data. The image generating section 11 supplies information of the waiting time to the eco-state sensing circuit 8 in transferring image data (i.e., when refresh is carried out).

The eco-state sensing circuit 8 determines whether the latest waiting time acquired from the image generating section 11 is longer than a threshold. The waiting time which is longer than the threshold means that refresh is not carried out for a long period. Thus, the eco-state sensing circuit 8 determines that an operating state of a display device 1 is an eco-state. Meanwhile, the waiting time which is not longer than the threshold means that refresh is frequently carried out. Thus, the eco-state sensing circuit 8 determines that the operating state of the display device 1 is a normal state.

(Refresh Rate Specifying Method 2)

Figure 4:
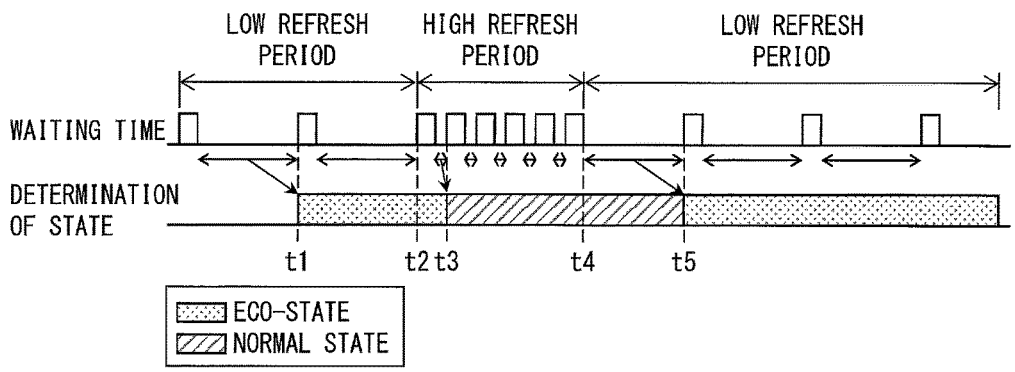
FIG. 4 is a timing chart showing an example of a refresh rate specifying method of another embodiment of the present invention.

FIG. 4 is a timing chart showing an example of a refresh rate specifying method of Embodiment 2. A rectangle in "WAITING TIME" of FIG. 4 shows that image data is transferred from the image generating section 11, i.e., that a display screen is refreshed. An arrow between a respective plurality of rectangles shows a waiting time. The other items of FIG. 4 are similar in meaning to those of FIG. 3.

According to Embodiment 2, the eco-state sensing circuit 8 which has acquired information of the waiting time from the image generating section 11 specifies a current refresh rate in accordance with a length of the waiting time. The waiting time and the refresh rate are in such a relationship as a reciprocal (inverse) relationship. The refresh rate is expressed as $1/(a+x)$ where a time of the transfer operation carried out by the image generating section 11 (a time corresponding to a rectangle in FIG. 4) is a and the waiting time (a time corresponding to an arrow) in FIG. 4 is x.

When refresh is carried out at a time t2, the latest waiting time is a waiting time shown by an arrow between a time t1 and the time t2. Thus, at the time t2, the latest waiting time is longer than the threshold. Therefore, at the time t2, the eco-state sensing circuit 8 determines that the display device 1 is in the eco-state in which the refresh rate is low.

When refresh is carried out at a time t3, the latest waiting time is a waiting time shown by an arrow between the time t2 and the time t3. Thus, at the time t3, the latest waiting time is shorter than the threshold. Therefore, at the time t3, the eco-state sensing circuit 8 determines that the display device 1 is in the normal state. Same applies to a period from and after the time t3 to a time t4.

Note here that the eco-state sensing circuit 8 determines the operating state in accordance with the information from the image generating section 11. Thus, the eco-state sensing circuit 8 can determine the operating state in Embodiment 2 earlier than in Embodiment 1.

At a time t5, the eco-state sensing circuit 8 acquires the information of the waiting time from the image generating section 11. At the time t5, the waiting time is longer than the threshold, and the eco-state sensing circuit 8 determines again that the display device 1 is in the eco-state in which the refresh rate is low. In accordance with a result of the determination, a state display control circuit 9 supplies, to the image processing circuit 6, information controlling a display of an eco-state mark. In accordance with the information controlling a display of the eco-state mark, the image processing circuit 6 combines the eco-state mark with image data received from the image generating section 11. This causes a display of the eco-state mark to be reflected in the display screen at a timing of refresh. Therefore, the display device 1 can display the eco-state mark during refresh at the time t5.

As in the case of Embodiment 1, according to Embodiment 2, the eco-state sensing circuit 8 can be arranged to set a plurality of thresholds for determining the waiting time and to determine the operating state of the display device 1 by dividing the operating state into three or more levels. Furthermore, the eco-state sensing circuit 8 can cause a hysteresis to determine the waiting time by use of a plurality of thresholds. Moreover, the eco-state sensing circuit 8 can determine the operating state by averaging a plurality of waiting times and using an average of the plurality of waiting times. The state display control circuit 9 can be arranged to display an eco-state mark 21 only when a plurality of waiting times each of which is not longer than a threshold is consecutive.

[Embodiment 3]

Embodiment 3 differs from each of the embodiments described earlier in that Embodiment 3 is arranged such that a refresh rate is specified in accordance with a pattern of presence or absence of refresh (update pattern) in a plurality of most recent vertical periods. Note that an arrangement of a display device of Embodiment 3 is identical to the arrangement illustrated in FIG. 1.

An eco-state sensing circuit 8 acquires, from an image generating section 11 or a timing controller 7, information of presence or absence of refresh in each vertical period (refresh information). The eco-state sensing circuit 8 specifies the refresh rate in accordance with a pattern of presence or absence of refresh in a plurality of (here, two) most recent vertical periods. In a case where refresh is consecutively carried out (in the case of a pattern of "update-update") in two most recent vertical periods, the eco-state sensing circuit 8 determines that the display device 1 is in a normal state in which the refresh rate is relatively high. Meanwhile, in a case where the number of times of refresh is one or zero in two most recent vertical periods, the eco-state sensing circuit 8 determines that the display device 1 is in an eco-state in which the refresh rate is relatively low. For example, in a case where an update pattern of a display screen in two vertical periods is "update-pause", "pause-update", or "pause-pause", it is determined that an operating state of the display device 1 is the eco-state.

Note that according to Embodiment 3, a change in light emission by an auxiliary display section 4 instead of the display screen causes the operating state to be presented to a user. For example, in a case where the operating state is the normal state, the auxiliary display section 4 is off ((b) of FIG. 7). Meanwhile, in a case where the operating state is the eco-state, the auxiliary display section 4 is on ((a) of FIG. 7). In a case where the auxiliary display section 4 indicates the operating state, no eco-state mark 21 needs to be displayed in a display screen 20.

(Refresh Rate Specifying Method 3)

Figure 5:
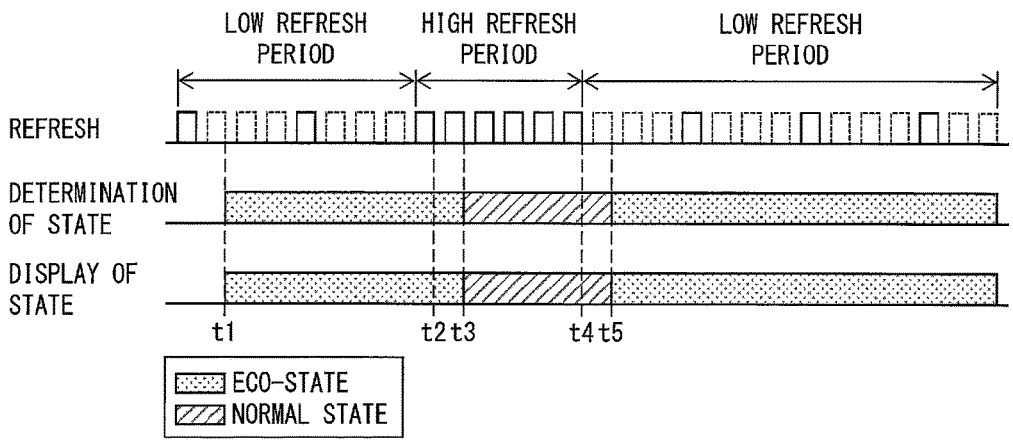
FIG. 5 is a timing chart showing an example of a refresh rate specifying method of still another embodiment of the present invention.

FIG. 5 is a timing chart showing an example of a refresh rate specifying method of Embodiment 3. In "REFRESH" of FIG. 5, a rectangle drawn in a solid line shows that refresh (updating) is carried out in a vertical period corresponding to that rectangle, and a rectangle drawn in a broken line shows that refresh is not carried out in a vertical period corresponding to that rectangle. "DISPLAY OF STATE" of FIG. 5 indicates an operating state to be displayed by the auxiliary display section 4. The other items of FIG. 5 are similar in meaning to those of FIG. 3.

At a time t1, an update pattern in two most recent vertical periods is "update-pause" in order of time. Thus, at the time t1, the eco-state sensing circuit 8 determines that the display device 1 is in the eco-state in which the refresh rate is low. From the time t1 to a time t2, since vertical periods of updating are not consecutive, it is determined that the operating state is the eco-state.

At a time t3, an update pattern in two most recent vertical periods is "update-update" in order of time. Thus, at the time t3, the eco-state sensing circuit 8 determines that the operating state is the normal state in which the refresh rate is high. In response to a result of the determination, a state display control circuit 9 causes the auxiliary display section 4 to turn off. Same applies to a period from and after the time t3 to a time t4.

At a time t5, an update pattern in two most recent vertical periods is "update-pause" in order of time. Thus, at the time t5, the eco-state sensing circuit 8 determines that the operating state is the eco-state. In response to a result of the determination, the state display control circuit 9 causes the auxiliary display section 4 to turn on (indicate the eco-state).

Turning-on and turning-off of the auxiliary display section 4 can be switched irrespective of refresh of the display screen. Thus, a display device 1 can notify a user of a change in operating state without the need to wait for a timing of the next refresh. This makes it possible to improve followability of a state display with respect to an actual operating state.

Further, the display device 1 determines the operating state in accordance with an update pattern in several most recent vertical periods. Thus, also in a case where the refresh rate frequently varies in a range of 60 Hz to 1 Hz in a short period, it is possible to notify a user of a change in operating state by specifying a period of a low refresh rate (1 Hz).

(Refresh Rate Specifying Method 4)

FIG. 6 is a timing chart showing another example of the refresh rate specifying method of Embodiment 3. Items of FIG. 6 are similar in meaning to those of FIG. 5. In this example, the eco-state sensing circuit 8 determines the operating state in accordance with an update pattern in three most recent vertical periods. In a case where refresh is consecutively carried out in three most recent vertical periods (in the case of a pattern of "update-update-update"), the eco-state sensing circuit 8 determines that the display device 1 is in the normal state in which the refresh rate is relatively high. In a case where the number of times of refresh is one or zero in three most recent vertical periods, the eco-state sensing circuit 8 determines that the display device 1 is in the eco-state in which the refresh rate is relatively low (a first eco-state). For example, in a case where an update pattern in three vertical periods is "update-pause-pause", "pause-update-pause", "pause-pause-update", or "pause-pause-pause", it is determined that the operating state is the eco-state. Meanwhile, in a case where the number of times of refresh is two in three most recent vertical periods, the eco-state sensing circuit 8 determines that the display device 1 is in an intermediate state in which the refresh rate is intermediate (a second eco-state). For example, in a case where an update pattern in three vertical periods is "update-update-pause", "update-pause-update", or "pause-update-update", it is determined that the operating state is the intermediate state.

From the time t1 to the time t2, an update pattern in three most recent vertical periods is any one of "update-pause-pause", "pause-update-pause", "pause-pause-update", and "pause-pause-pause. Thus, from the time t1 to the time t2, the eco-state sensing circuit 8 determines that the display device 1 is in the eco-state in which the refresh rate is low.

At the time t3, an update pattern in three most recent vertical periods is "update-update-pause" in order of time. Thus, at the time t3, the eco-state sensing circuit 8 determines that the display device 1 is in the intermediate state in which the refresh rate is intermediate. Same applies to a time t6.

From the time t4 to the time t5, the eco-state sensing circuit 8 determines that the display device 1 is in the normal state in which the refresh rate is high. From and after a time t7, the eco-state sensing circuit 8 determines that the display device 1 is in the eco-state.

In this case, a change in color or intensity of light emission by the auxiliary display section 4 causes the operating state to be presented to a user. For example, the auxiliary display section 4 can be arranged such that the auxiliary display section 4 is off in a case where the operating state is the normal state, the auxiliary display section 4 is on in green in a case where the operating state is the intermediate state, and the auxiliary display section 4 is on in blue in a case where the operating state is the eco-state.

Note that the eco-state sensing circuit 8 can determine the operating state in accordance with an update pattern in four or more vertical periods. By thus determining the operating state in accordance with an update pattern in a plurality of most recent vertical periods, it is possible to improve followability of a result of the determination by the eco-state sensing circuit 8 with respect to an actual operating state (see FIGS. 5 and 6).

Note that the eco-state sensing circuit 8 can be arranged to determine the operating state in accordance with an update pattern and the state display control circuit 9 can be arranged to cause an image indicative of the determined operating state to be displayed in the display screen at a timing of refresh as in each of the embodiments described earlier.

Further, irrespective of the number of times of updating, the operating state can be determined in accordance with an update pattern as below. Assume, for example, that updating is carried out two times in three vertical periods. In this case, when an update pattern is "update-update-pause" or "pause-update-update", it can be determined that the operating state is the normal state, and when an update pattern is "update-pause-update", it can be determined that the operating state is the eco-state. In this case, it is not determined that the operating state is the intermediate state. For example, in a case where a vertical period in which updating is carried out and a vertical period in which updating is paused alternately appear, an update pattern in three vertical periods is either of "update-pause-update" and "pause-update-pause". Both of these update patterns result in determination that the operating state is the eco-state, assuming, for example, that the display device 1 operates at a refresh rate of 30 Hz, which is half a maximum refresh rate of 60 Hz. Therefore, without the fear that the normal state and the eco-state are frequently switched while the display device 1 operates at such a refresh rate, it can be determined that the display device 1 is stably in the eco-state.

[Embodiment 4]

Embodiment 4 discusses various methods for displaying a specified refresh rate. The display methods below can be used in combination with the embodiments described earlier.

Figure 8:
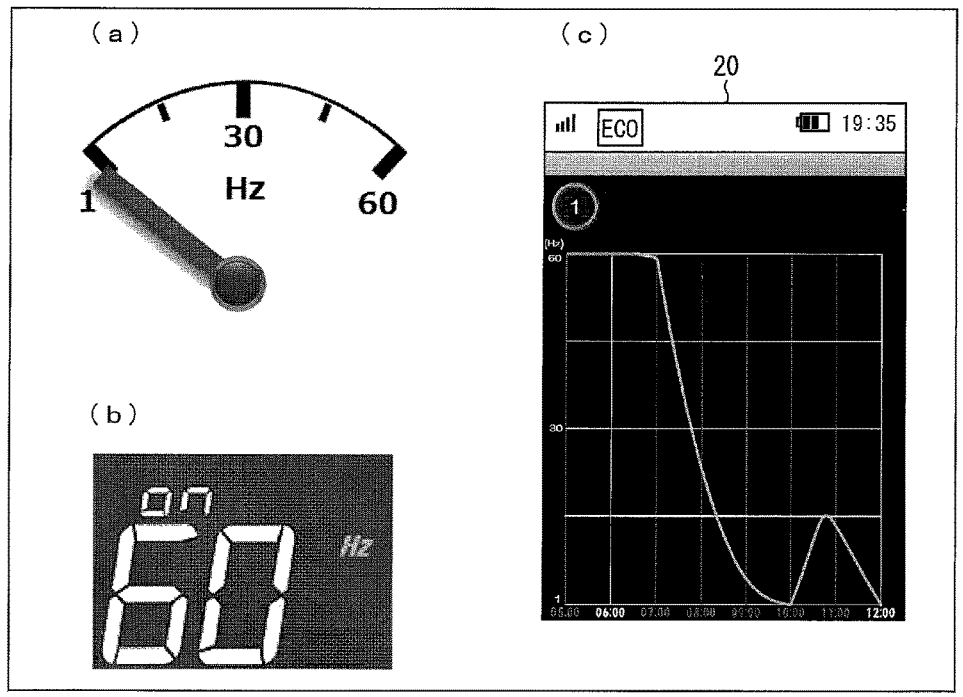
FIG. 8 is a view showing various examples in each of which a refresh rate specified by the display device is displayed.

(a) of FIG. 8 is a view showing an example of a meter display of a specified refresh rate. A state display control circuit 9 can receive information of a specified refresh rate from an eco-state sensing circuit 8 so as to display a change in refresh rate by a continuous meter display. An indicator pointing to a value of a refresh rate can continuously move or can move in stages. Such a meter display can be made instead of a display of an eco-state mark or can be made at a place different from a place where the display of the eco-state mark is made.

(b) of FIG. 8 is a view showing an example of a digital numerical display of a specified refresh rate. A value of a refresh rate can be displayed by a digital numerical display instead of the meter display.

(c) of FIG. 8 is a view showing an example of a graph display of a change in specified refresh rate. An image generating section 11 receives, from the eco-state sensing circuit 8, information indicative of transition of a state of the specified refresh rate, and stores the information. In accordance with, for example, an instruction by a user, the image generating section 11 generates a graph indicative of a change in refresh rate over time. The generated graph is displayed in a display screen 20. The graph can be a graph in any form, such as a line graph or a bar graph.

Further, the specified refresh rate can be expressed by changing a color of an auxiliary display section 4 between a cold color and a warm color.

Figure 9:
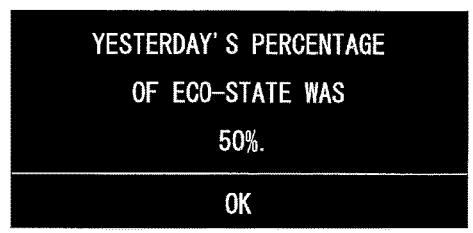
FIG. 9 is a view showing an example of a display that notifies a user of a past operating state in the display device.

FIG. 9 is a view showing an example of a display that notifies a user of a past operating state. The image generating section 11 receives information of the specified refresh rate from the eco-state sensing circuit and stores the information. The image generating section 11 calculates, as information of the past operating state, a percentage of an eco-state in a past predetermined period (second period), e.g., in a previous day. As illustrated in FIG. 9, the image generating section 11 causes the information of the past operating state (a percentage of the eco-state in one day) to be displayed in a display screen at a predetermined timing (e.g., at a predetermined time every morning).

With the above display methods, a user can visually recognize a degree of an eco-state and thus can intuitively recognize the degree of the eco-state. This makes it possible to raise eco-awareness of the user and to cause the user to be aware of how to use a display device 1 (portable terminal) so as to maintain its eco-state for a long time.

[Embodiment 5]

A display device 1 is arranged such that a refresh rate is automatically changed in accordance with image content. Note, however, that the display device 1 can also be arranged such that a user sets a range in which the refresh rate is variable. A rate limiting section 12 changes (sets), in accordance with an instruction by a user, an upper limit of a range in which the refresh rate varies. The instruction by the user is inputted by the user via an input device (a touch panel, a key, or the like) provided in the display device 1. A range of the refresh rate in terms of specifications of the display device 1 (in which range the display device 1 is operable) is, for example, 1 Hz to 60 Hz. The rate limiting section 12 notifies an image generating section 11 of the upper limit thus set.

In a case where an upper limit of the range in which the refresh rate varies is set at 60 Hz, the display device 1 carries out a screen display by changing the refresh rate in a range of 1 Hz to 60 Hz in accordance with an image to be displayed. In a case where the upper limit of the range in which the refresh rate varies is set at 45 Hz, the display device 1 carries out a screen display by changing the refresh rate in a range of 1 Hz to 45 Hz in accordance with an image to be displayed. In a case where the upper limit of the range in which the refresh rate varies is set at 30 Hz, the display device 1 carries out a screen display by changing the refresh rate in a range of 1 Hz to 30 Hz in accordance with an image to be displayed. That is, even in the case of, for example, a moving image whose frame rate is 60 Hz, the image generating section 11 carries out image processing such as frame omission or frame interpolation and supplies image data to an image processing circuit 6 at a refresh rate falling within a specified range.

In a case where an upper limit of the refresh rate is set to be low, a user can reduce electric power consumption. The display device 1 can provide a user with an option to give priority to either of a display quality of a moving image and electric power consumption.

[Embodiment 6]

It is also possible to subject respective display devices (portable terminals) of a plurality of users to competition between a display device of a user and a display device of another user in amount of reduction in display-related electric power consumption. For example, an operator of an external server can hold an event in which a plurality of users is subjected to competition in amount of reduction in electric power consumption.

An electric power amount specifying section 13 acquires information of an actual refresh rate from an image generating section 11 or an eco-state sensing circuit 8. Since it is necessary to write image data to a display panel 3 during refresh, in a case where refresh is carried out more times, an amount of electric power which amount is necessary for a display increases accordingly. An average amount of electric power which average amount is needed to carry out refresh one time can be measured in advance. The electric power amount specifying section 13 stores, in advance, an average amount of electric power which average amount is needed to carry out refresh one time. The electric power amount specifying section 13 specifies (estimates), in a predetermined period, an amount of electric power which amount was successfully reduced due to a decrease in refresh rate from a maximum value (e.g., 60 Hz). Note here that the amount of electric power which amount was successfully reduced refers to an amount of electric power which amount is obtained by subtracting an amount of electric power which amount is necessary for a display that is carried out at an actual refresh rate from an amount of electric power which amount is necessary for a display that is carried out at a maximum refresh rate (60 Hz). The electric power amount specifying section 13 transmits, to the external server via a communication section 14, information of the amount of electric power which amount was successfully reduced.

The external server stores the information of the amount of electric power which amount was successfully reduced, the information having been acquired from each of the plurality of users (display devices). The server compares (a) an amount of electric power which amount was successfully reduced by a display device 1 of a user who has transmitted the information and (b) an amount of electric power which amount was successfully reduced by a display device of another user. The server transmits a result of the comparison to the display device 1 of the user who has transmitted the information.

The result of the comparison between the amounts of electric power which amounts were successfully reduced can be, a result that shows a place in which the amount of electric power which amount was successfully reduced by the display device of the user who has transmitted the information is ranked among the amounts of electric power which amounts were successfully reduced by the respective plurality of display devices, a result of comparison between (a) the amount of electric power which amount was successfully reduced by the display device of the user who has transmitted the information and (b) an average of the amounts of electric power which amounts were successfully reduced by the respective plurality of display devices, or a result of comparison (magnitude relationship) between (a) the amount of electric power which amount was successfully reduced by the display device of the user who has transmitted the information and (b) a specific value (an amount of electric power which amount was successfully reduced by another specific display device).

The display device 1 which has received the result of the comparison via the communication section 14 can notify the user of the result of the comparison by causing the result of the comparison to be displayed in a display screen of the display device 1. In a case where the result of the comparison (e.g., a rank) is at a level that is not lower than a predetermined standard, a state display control circuit 9 can cause a display of an eco-labelling mark or a display by an auxiliary display section 4 to be a special display (to have a special color). It is possible to raise eco-awareness of a user by notifying the user of a result of comparison with a display device of another user.

Note that it is possible to provide an update specifying section instead of the electric power amount specifying section 13. The update specifying section specifies, in accordance with information of an actual refresh rate, a measured value obtained in a predetermined period and related to the number of times of refresh, such as an average refresh rate or the number of times of refresh. A difference between a maximum refresh rate and an average refresh rate and a difference between the maximum number of times of refresh in a predetermined period and the actual number of times of refresh in the predetermined period each correspond to an amount of electric power which amount was successfully reduced in terms of a display. Thus, the server can compare average refresh rates, the numbers of times of refresh, or the like instead of amounts of electric power which amounts were successfully reduced. As described above, a measured value related to the number of times of refresh can be used instead of an amount of electric power. A refresh rate or the like, which is less likely to cause a variation among terminals than an amount of electric power, is suitable as an evaluation value in a case where a plurality of terminals is compared in, for example, an event.

[Software Implementation Example]

Control blocks of the display device 1 (particularly, the image generating section 11, the rate limiting section 12, the electric power amount specifying section 13, the communication section 14, the eco-state sensing circuit 8, and the state display control circuit 9) may be realized by a logic circuit (hardware) provided in an integrated circuit (IC chip) or the like or may be realized by software as executed by a central processing unit (CPU).

In the latter case, the display device 1 includes: a CPU that executes instructions of a program that is software realizing the foregoing functions; a read only memory (ROM) or a storage device (each referred to as "storage medium") storing the program and various kinds of data in such a form that they are readable by a computer (or a CPU); and a random access memory (RAM) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a computer data signal embedded in a carrier wave which is embodied by electronic transmission.

[Conclusion]

A display device (1) in accordance with Aspect 1 of the present invention for refreshing a display screen at a refresh rate which is variable, the display device (1) includes: a rate detecting section (eco-state sensing circuit 8) for specifying the refresh rate which is variable; and a state presenting section (state display control circuit 9) for presenting, to a user, information indicative of a degree of the specified refresh rate (an operating state of the display device 1).

The arrangement allows a user to recognize that the display device is operating while having a low refresh rate, i.e., while consuming a small amount of electric power. Thus, an automatic change in refresh rate by the display device allows the user to realize that electric power consumption is reduced.

In Aspect 2 of the present invention, the display device can be arranged in the Aspect 1 to further include: a timing controller for generating a timing signal instructing the display screen to be refreshed, the rate detecting section specifying the refresh rate in accordance with how many times in a predetermined period the display screen is instructed by the timing controller to be refreshed.

In Aspect 3 of the present invention, the display device can be arranged in the Aspect 1 to further include: an image generating section for generating image data to be displayed, the rate detecting section specifying the refresh rate in accordance with a time elapsed from the last time the image generating section output the image data. The arrangement makes it possible to specify, in accordance with a length of a standby time of the image generating section (a time elapsed from the last time the image generating section output the image data), intervals at which refresh is carried out.

In Aspect 4 of the present invention, the display device can be arranged such that in the Aspect 1, for a plurality of most recent vertical periods, the rate detecting section specifies the refresh rate in accordance with a pattern of presence or absence of refresh in each of the plurality of most recent vertical periods. The arrangement makes it possible to improve followability of a result of the determination by the rate detecting section with respect to an actual operating state.

In Aspect 5 of the present invention, the display device can be arranged such that in any one of the Aspects 1 through 4, the state presenting section presents, to the user, the information indicative of the degree of the refresh rate by carrying out a display in a display section different from the display screen, changing a luminance of a backlight of the display screen, or outputting a specific sound. The arrangement makes it possible to present a state of the refresh rate to the user without the need to refresh the display screen. Thus, it is possible to improve followability of presentation of the result of the determination.

In Aspect 6 of the present invention, the display device can be arranged such that in any one of the Aspects 1 through 5, the state presenting section presents the degree of the refresh rate to the user by dividing the degree of the refresh rate into at least three levels. The arrangement makes it possible to notify the user of specific information of the state of the refresh rate (operating state).

In Aspect 7 of the present invention, the display device can be arranged such that in any one of the Aspects 1 through 5, the state presenting section presents, to the user, the information indicative of the degree of the refresh rate only when the refresh rate has a lower limit value. The arrangement makes it possible to prevent an increase in electric power consumption required for presentation of the information to the user.

In Aspect 8 of the present invention, the display device can be arranged such that: in any one of the Aspects 1 through 7, by causing a state display in accordance with the degree of the refresh rate to be made in the display screen, the state presenting section presents, to the user, the information indicative of the degree of the refresh rate; and the state presenting section changes the state display in the display screen in accordance with either refresh carried out when image content of the image data to be displayed is changed, or refresh in accordance with a lower limit of the refresh rate. With the arrangement, the state display is changed when the display screen is refreshed. A timing of refresh is determined in accordance with a change in image content. This makes it possible to avoid a waste of carrying out refresh for the state display when the image content does not change.

In Aspect 9 of the present invention, the display device can be arranged in the Aspect 1 to further include: a timing controller for generating a timing signal instructing the display screen to be refreshed, the timing controller reducing the refresh rate in stages while a still image is being displayed in the display screen, by causing a state display in accordance with the degree of the refresh rate to be made in the display screen, the state presenting section presenting, to the user, the information indicative of the degree of the refresh rate, and the state presenting section changing the state display in the display screen when the display screen is refreshed. With the arrangement, without the fear of an increase in electric power consumption required for the refresh, it is possible to reduce a delay in change in state display (to allow real-time expression).

In Aspect 10 of the present invention, the display device can be arranged in the Aspect 1 to further include: an image generating section for generating image data to be displayed, the rate detecting section supplying transition of the degree of the specified refresh rate to the image generating section, and the image generating section displaying, in the display screen at a predetermined timing, the information indicative of the degree of the refresh rate in a predetermined period. The arrangement allows the user to recognize an energy-saving effect yielded by the display device, and consequently allows the user to be aware of further energy saving.

In Aspect 11 of the present invention, the display device can be arranged in the Aspect 1 to further include: an image generating section for generating image data to be displayed, the rate detecting section supplying transition of the degree of the specified refresh rate to the image generating section, and the image generating section generating the image data which shows the transition of the degree of the refresh rate in a form of a graph. The arrangement allows the user to visually recognize the energy-saving effect yielded by the display device.

In Aspect 12 of the present invention, the display device can be arranged in any one of the Aspects 1 through 11 to further include: a rate limiting section for changing, in accordance with an instruction by the user, an upper limit of a range in which the refresh rate varies.

In Aspect 13 of the present invention, the display device can be arranged in any one of the Aspects 1 through 11 to further include: an electric power amount specifying section (or update specifying section) for specifying an amount of electric power (or the number of times of refresh) which amount (number) was successfully reduced due to a decrease in refresh rate from a maximum value.

In Aspect 14 of the present invention, the display device can be arranged in the Aspect 13 to further include: a communication section for transmitting, to a server, information of the amount of electric power (or the number of times of refresh) which amount (number) was successfully reduced, and receiving, from the server, a result of comparison with an amount of electric power (or the number of times of refresh) which amount (number) was successfully reduced by a display device of another user. The arrangement makes it possible to raise eco-awareness of the user by comparing (a) an amount of electric power which amount was successfully reduced by the display device with (b) an amount of electric power which amount was successfully reduced by another display device.

The display device according to the foregoing aspects of the present invention may be realized by a computer. In this case, the present invention encompasses: a control program for the display device which program causes a computer to operate as the foregoing sections (software elements) of the display device so that the display device can be realized by the computer; and a computer-readable recording medium storing the control program therein.

A method in accordance with Aspect 15 of the present invention for controlling a display device for refreshing a display screen at a refresh rate which is variable, the method includes: a rate detecting step (S1, S2) of specifying the refresh rate which is variable; and a state presenting step (S4, S6) of presenting, to a user, information indicative of a degree of the specified refresh rate.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention can be used for a display device and a portable terminal.

REFERENCE SIGNS LIST

1 Display device
2 Host control circuit
3 Display panel
4 Auxiliary display section
5 Speaker
6 Image processing circuit
7 Timing controller
8 Eco-state sensing circuit (rate detecting section)
9 State display control circuit (state presenting section)
11 Image generating section
12 Rate limiting section
13 Electric power amount specifying section
14 Communication section
20 Display screen
21 Eco-state mark (state display)

The invention claimed is:

1. A display device that refreshes a display screen at a refresh rate which is variable, the display device comprising:
   rate detecting circuitry that specifies the refresh rate which is variable;
   a timing controller that generates a timing signal instructing the display screen to be refreshed; and
   state presenting circuitry that presents, to a user, information indicative of a degree of a specified refresh rate, wherein
   the rate detecting circuitry specifies the refresh rate in accordance with how many times in a predetermined period the display screen is instructed by the timing controller to be refreshed,
   the rate detecting circuitry determines whether or not the specified refresh rate is higher than a threshold, and
   when it is determined that the specified refresh rate is lower than the threshold, the state presenting circuitry presents an indicator indicating that the specified refresh rate is in a low state.

2. The display device as set forth in claim 1, wherein the state presenting circuitry (i) presents, to the user, the information indicative of the degree of the refresh rate by carrying out a display in a display portion different from the display screen,(ii) changes a luminance of a backlight of the display screen, or (iii) outputs a specific sound.

3. The display device as set forth in claim 1, wherein the state presenting circuitry presents, to the user, the information indicative of the degree of the refresh rate only when the refresh rate has a lower limit value.

4. The display device as set forth in claim 1, wherein:
   by causing a display state in accordance with the degree of the refresh rate to be made in the display screen, the state presenting circuitry presents, to the user, the information indicative of the degree of the refresh rate; and
   the state presenting circuitry changes the display state in the display screen in accordance with either refresh carried out when image content of the image data to be displayed is changed, or refresh in accordance with a lower limit of the refresh rate.

5. The display device as set forth in claim 1, wherein
   the timing controller reduces the refresh rate in stages while a still image is being displayed in the display screen,
   by causing a state display in accordance with the degree of the refresh rate to be made in the display screen, the state presenting circuitry presents, to the user, the information indicative of the degree of the refresh rate, and
   the state presenting circuitry changes the display state in the display screen when the display screen is refreshed.

6. The display device as set forth in claim 1, further comprising:
   image generating circuitry that generates image data to be displayed, wherein
   the rate detecting circuitry supplies transition of the degree of the specified refresh rate to the image generating circuitry, and
   the image generating circuitry displays, in the display screen at a predetermined timing, the information indicative of the degree of the refresh rate in a predetermined period.

7. The display device as set forth in claim 1, further comprising:
   image generating circuitry that generates image data to be displayed, wherein
   the rate detecting circuitry supplies transition of the degree of the specified refresh rate to the image generating circuitry, and
   the image generating circuitry generates the image data which shows the transition of the degree of the refresh rate in a form of a graph.

8. The display device as set forth in claim 1, further comprising:
   image generating circuitry that generates image data to be displayed on a display screen; and
   image processing circuitry that processes the image data, wherein
   when it is determined by the rate detecting circuitry that the specified refresh rate is lower than the threshold, the image processing circuitry combines an image indicative of the indicator with an image of the image data to obtain a combined image and causes the display screen to display the combined image.

9. A non-transitory computer-readable storage medium storing a control program that causes a computer to function as a display device recited in claim 1, the control program causing the computer to function as each of the rate detecting circuitry and the state presenting circuitry.

10. A display device that refreshes a display screen at a refresh rate which is variable, the display device comprising:
   rate detecting circuitry that specifies the refresh rate which is variable;
   image generating circuitry that generates image data to be displayed; and
   state presenting circuitry that presents, to a user, information indicative of a degree of a specified refresh rate, wherein
   the rate detecting circuitry determines whether or not the specified refresh rate is higher than a threshold,
   when it is determined that the specified refresh rate is lower than the threshold, the state presenting circuitry presents an indicator indicating that the specified refresh rate is in a low state, and the rate detecting circuitry specifies the refresh rate in accordance with a time elapsed from a last time that the image generating circuitry output the image data.

11. A display device that refreshes a display screen at a refresh rate which is variable, the display device comprising:
    rate detecting circuitry that specifies the refresh rate which is variable; and
    state presenting circuitry that presents, to a user, information indicative of a degree of a specified refresh rate, wherein
    the rate detecting circuitry determines whether or not the specified refresh rate is higher than a threshold,
    when it is determined that the specified refresh rate is lower than the threshold, the state presenting circuitry presents an indicator indicating that the specified refresh rate is in a low state, and
    for a plurality of most recent vertical periods, the rate detecting circuitry specifies the refresh rate in accordance with a pattern of presence or absence of refresh in each of the plurality of most recent vertical periods.

12. A method that controls a display device that refreshes a display screen at a refresh rate which is variable, the method comprising:
    a rate detecting step of specifying the refresh rate which is variable;
    a timing signal generating step of generating a timing signal instructing the display screen to be refreshed; and
    a state presenting step of presenting, to a user, information indicative of a degree of a specified refresh rate, wherein
    the rate detecting step specifies the refresh rate in accordance with how many times in a predetermined period the display screen is instructed by the timing controller to be refreshed,
    the rate detecting step includes determining whether or not the specified refresh rate is higher than a threshold, and
    when it is determined that the refresh rate is lower than the threshold, the state presenting step includes presenting an indicator indicating that the specified refresh rate is in a low state.

* * * * *